United States Patent
Sokolov

(10) Patent No.: US 8,918,387 B1
(45) Date of Patent: Dec. 23, 2014

(54) SYSTEMS AND METHODS FOR CLASSIFYING APPLICATIONS CONFIGURED FOR CLOUD-BASED PLATFORMS

(75) Inventor: Ilya Sokolov, Boston, MA (US)

(73) Assignee: Symantec Corporation, Mountain View, CA (US)

(*) Notice: Subject to any disclaimer, the term of this patent is extended or adjusted under 35 U.S.C. 154(b) by 0 days.

(21) Appl. No.: 13/439,468

(22) Filed: Apr. 4, 2012

(51) Int. Cl.
*G06F 7/00* (2006.01)

(52) U.S. Cl.
USPC ............................................ 707/707

(58) Field of Classification Search
CPC ............... G06F 17/30864; G06F 17/30867; G06F 17/3089; G06F 15/17306; G06F 17/30616; G06F 17/3087
USPC ............................................ 707/707
See application file for complete search history.

(56) References Cited

U.S. PATENT DOCUMENTS

| | | | | |
|---|---|---|---|---|
| 2008/0270451 | A1* | 10/2008 | Thomsen et al. | 707/102 |
| 2012/0054871 | A1* | 3/2012 | Soby et al. | 726/25 |
| 2012/0124659 | A1* | 5/2012 | Craft et al. | 726/9 |
| 2012/0216244 | A1 | 8/2012 | Kumar et al. | |
| 2013/0212684 | A1 | 8/2013 | Li et al. | |

OTHER PUBLICATIONS

Ilya Sokolov; Systems and Methods for Performing Security Analyses of Applications Configured for Cloud-Based Platforms; U.S. Appl. No. 13/439,458, filed on Apr. 4, 2012.
uProtect.it; Scan, Score, and Protect your Facebook from Suspicious 3rd Party Applications; https://uprotect.it/appscan; 2011.

* cited by examiner

*Primary Examiner* — Truong Vo
(74) *Attorney, Agent, or Firm* — ALG Intellectual Property, LLC

(57) ABSTRACT

A computer-implemented method for classifying applications configured for cloud-based platforms may include 1) identifying an online platform that hosts an online service and that is capable of hosting a plurality of third-party applications integrated with the online service and configured to operate on the online platform, 2) identifying at least one third-party application that is integrated with the online service and configured to operate on the online platform, 3) identifying metadata describing at least one characteristic of the third-party application, and 4) generating a classification of the third-party application based at least in part on the characteristic. Various other methods, systems, and computer-readable media are also disclosed.

20 Claims, 6 Drawing Sheets

SYSTEMS AND METHODS FOR CLASSIFYING APPLICATIONS CONFIGURED FOR CLOUD-BASED PLATFORMS

BACKGROUND

Internet users increasingly rely on cloud-based services for social networking, shopping, gaming, and other activities. Some cloud-based services have achieved user bases of hundreds of millions of users and have extended their platforms to attract more users and/or keep existing users within the services' online ecosystems. For example, some cloud-based services have provided interfaces for creating cloud-based applications that third-party vendors may use to provide applications via the cloud-based services and/or customize users' experiences within these services.

In order to encourage vendor participation and development of new and useful third-party applications, a cloud-based service may maintain relatively low standards for vendor registration and submissions. Unfortunately, the large user bases available under these uniform platforms may attract undesirable vendors and third-party applications, potentially bringing scams, phishing attempts, spam attacks, and/or unwanted content to users. Traditional security systems for identifying and remediating illegitimate content may fail to correctly analyze third-party applications delivered via cloud-based services without understanding what the third-party applications are about and/or purport to accomplish. Furthermore, even legitimate third-party applications may overwhelm users when presented in large, disorganized catalogs. Accordingly, the instant disclosure identifies and addresses a need for additional and improved systems and methods for classifying applications configured for cloud-based platforms.

SUMMARY

As will be described in greater detail below, the instant disclosure generally relates to systems and methods for classifying applications configured for cloud-based platforms by identifying the applications (e.g., as separate from the cloud-based platforms which host them) and identifying metadata (e.g., by requesting, extracting, crawling for, and/or mining for the metadata) useful for classifying the applications. In one example, a computer-implemented method for classifying applications configured for cloud-based platforms may include 1) identifying an online platform that hosts an online service and that is capable of hosting a plurality of third-party applications integrated with the online service and configured to operate on the online platform, 2) identifying at least one third-party application that is integrated with the online service and configured to operate on the online platform, 3) identifying metadata describing at least one characteristic of the third-party application, and 4) generating a classification of the third-party application based at least in part on the characteristic.

In some examples, identifying the third-party application may include 1) identifying user-generated content within the online service that references the third-party application and 2) identifying content generated by the third-party application within the online service. Additionally or alternatively, identifying the third-party application may include 1) retrieving, from the online service, a list of third-party applications available on the online platform and 2) identifying an email flagged by a spam filter that references the third-party application.

In some embodiments, identifying the metadata describing the characteristic of the third-party application may include retrieving the metadata from an application programming interface of the online service. Additionally or alternatively, identifying the metadata may include interacting with the third-party application during an active session with the online service. In one embodiment, identifying the metadata may include parsing a canvas page including at least a portion of the third-party application to identify 1) textual content within the canvas page, 2) links within the canvas page, 3) the structure of the canvas page, and/or 4) one or more elements within the canvas page. Additionally or alternatively, identifying the metadata may include 1) identifying a profile space for the third-party application within the online service and 2) identifying at least one user-submitted comment to a commenting feed on the profile space.

In one example, identifying the metadata may include identifying one or more permissions used by the third-party application within the online platform. In this example, generating the classification of the third-party application may include identifying a classification of applications with a legitimate use for the permission. In some examples, generating the classification of the third-party application may include 1) determining, based on the metadata, that a vendor of the third-party application is also the vendor of an additional third-party application, 2) identifying an attribute of the additional third-party application, and 3) generating the classification at least in part based on the attribute of the additional third-party application.

In some examples, the computer-implemented method may also include providing the classification to 1) a security system for evaluating third-party applications integrated with the online service, 2) a content control system for third-party applications integrated with the online service, 3) a search index for the online service, and/or 4) a user of the online service.

In one embodiment, a system for implementing the above-described method may include 1) an identification module programmed to identify an online platform that hosts an online service and that is capable of hosting a plurality of third-party applications integrated with the online service and configured to operate on the online platform, 2) an application module programmed to identify at least one third-party application that is integrated with the online service and configured to operate on the online platform, 3) a metadata module programmed to identify metadata describing at least one characteristic of the third-party application, and 4) a classification module programmed to generate a classification of the third-party application based at least in part on the characteristic. The system may also include at least one processor configured to execute the identification module, the application module, the metadata module, and the classification module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify an online platform that hosts an online service and that is capable of hosting a plurality of third-party applications integrated with the online service and configured to operate on the online platform, 2) identify at least one third-party application that is integrated with the online service and configured to operate on the online platform, 3) identify metadata describing at least one characteristic of the third-party application, and 4) generate a classification of the third-party application based at least in part on the characteristic.

As will be explained in greater detail below, by identifying the applications (e.g., as separate from the cloud-based platforms which host them) and identifying metadata (e.g., by requesting, extracting, crawling for, and/or mining for the metadata) useful for classifying the applications, the systems and methods described herein may facilitate and/or enable the limiting of access to illegitimate, malicious, and/or undesired third-party applications within otherwise trusted cloud-based platforms. Additionally or alternatively, these systems and methods may facilitate controlling access to, filtering, and/or organizing third-party applications within cloud-based platforms. For example, the classifications generated by these systems and methods may facilitate security analyses of third-party applications, content-control filtering of third-party applications, cataloging of third-party applications, and/or searching for third-party applications. Furthermore, the systems and methods described herein may classify applications that may otherwise go unclassified by distinguishing third-party applications from the cloud-based services with which they are integrated and leveraging actions and data specific to cloud-based services to classify the third-party applications.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
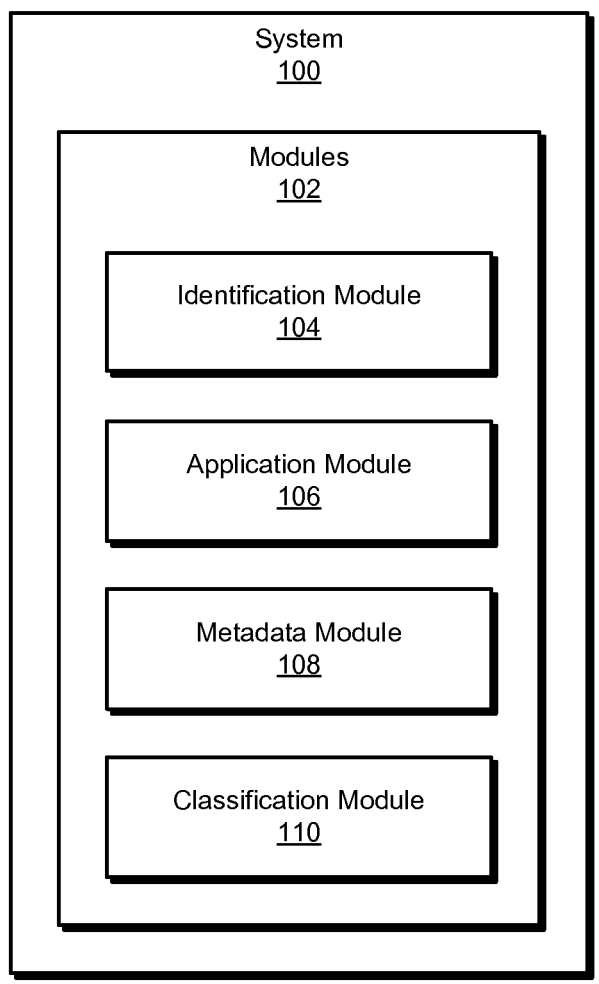
FIG. 1 is a block diagram of an exemplary system for classifying applications configured for cloud-based platforms.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
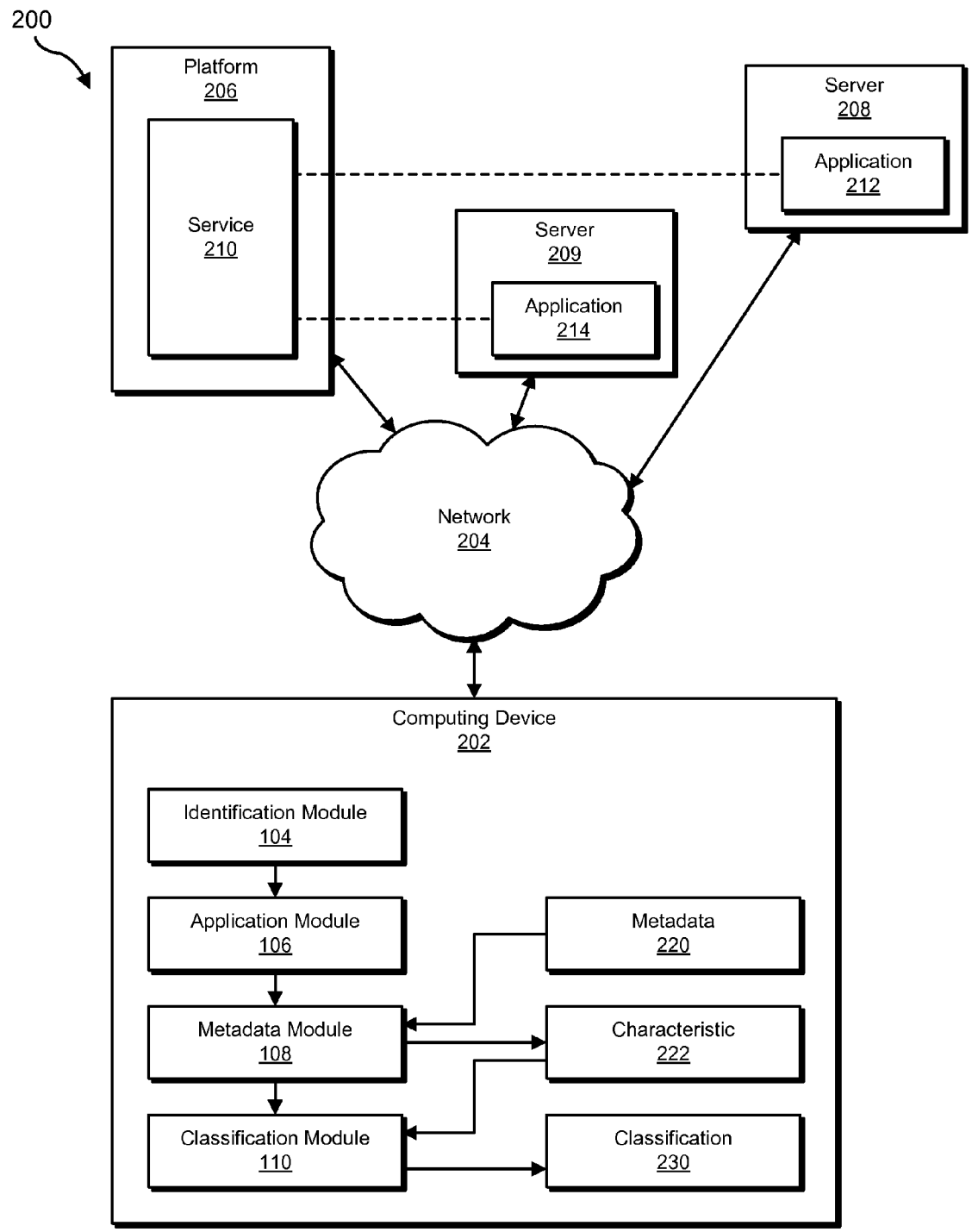
FIG. 2 is a block diagram of an exemplary system for classifying applications configured for cloud-based platforms.

The following will provide, with reference to FIGS. 1-2, detailed descriptions of exemplary systems for classifying applications configured for cloud-based platforms. Detailed descriptions of corresponding computer-implemented methods will also be provided in connection with FIG. 3. Detailed descriptions of exemplary classifications of applications configured for cloud-based platforms will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for classifying applications configured for cloud-based platforms. As illustrated in this figure, exemplary system 100 may include one or more modules 102 for performing one or more tasks. For example, and as will be explained in greater detail below, exemplary system 100 may include an identification module 104 programmed to identify an online platform that hosts an online service and that is capable of hosting a plurality of third-party applications integrated with the online service and configured to operate on the online platform. Exemplary system 100 may also include an application module 106 programmed to identify at least one third-party application that is integrated with the online service and configured to operate on the online platform. Exemplary system 100 may additionally include a metadata module 108 programmed to identify metadata describing at least one characteristic of the third-party application.

In addition, and as will be described in greater detail below, exemplary system 100 may include a classification module 110 programmed to generate a classification of the third-party application based at least in part on the characteristic. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or platform 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a platform 206 via a network 204 (e.g., to access a service 210).

In one embodiment, one or more of modules 102 from FIG. 1 may, when executed by at least one processor of computing device 202, facilitate computing device 202 in classifying applications configured for cloud-based platforms. For example, and as will be described in greater detail below, identification module 104, application module 106, metadata module 108, and/or classification module 110 may cause computing device 202 to 1) identify an online platform 206 that hosts an online service 210 and that is capable of hosting a plurality of third-party applications (e.g., applications 212 and 214) integrated with service 210 and configured to operate on platform 206, 2) identify at least one third-party application (e.g., application 212) that is integrated with service 210 and configured to operate on platform 206, 3) identify metadata 220 describing at least one characteristic (e.g., a characteristic 222) of application 212, and 4) generate a classification of application 212 based at least in part on characteristic 222.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Platform 206 generally represents any type or form of computing device that is capable of hosting, delivering, and/or referencing applications and/or services online. Examples of platform 206 include, without limitation, application servers and database servers configured to provide various database services and/or run certain software applications. In one example, service 210 may, as a part of platform 206, provide references to servers 208 and 209 for loading applications 212 and 214 (e.g., by serving a web document including an IFRAME that loads application 212 from server 208 and/or application 214 from server 209). Additionally or alternatively, platform 206 may include and/or store applications 212 and 214 directly.

Servers 208 and 209 generally represents any type or form of computing device that is capable of hosting and/or delivering applications and/or services online. Examples of servers 208 and 209 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and platform 206.

Figure 3:
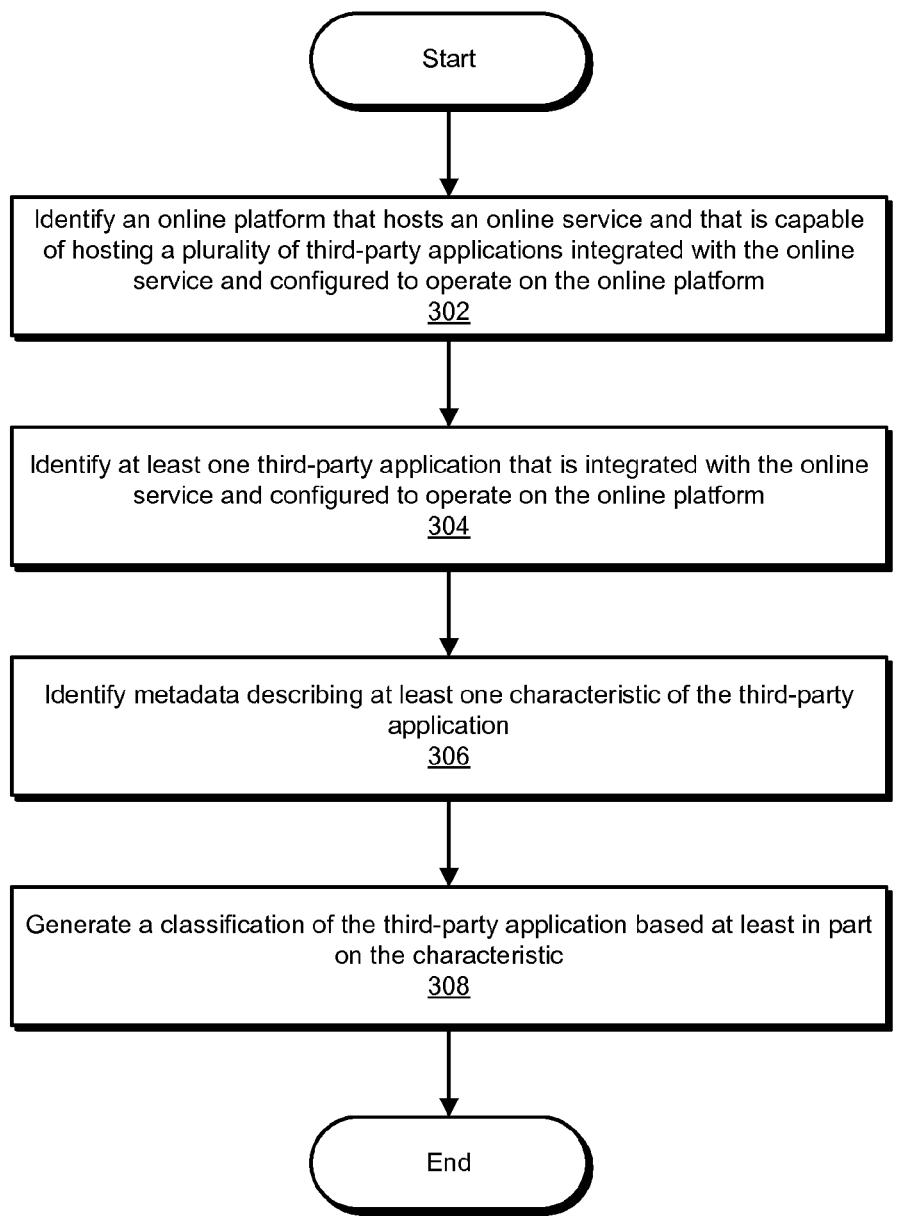
FIG. 3 is a flow diagram of an exemplary method for classifying applications configured for cloud-based platforms.

FIG. 3 is a flow diagram of an exemplary computer-implemented method 300 for classifying applications configured for cloud-based platforms. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify an online platform that hosts an online service and that is capable of hosting a plurality of third-party applications integrated with the online service and configured to operate on the online platform. For example, at step 302 identification module 104 may, as part of computing device 202 in FIG. 2, identify platform 206 that hosts service 210 and that is capable of hosting a plurality of third-party applications (e.g., applications 212 and 214) integrated with service 210 and configured to operate on platform 206.

As used herein, the phrase "online platform" may refer to any computing device and/or devices, software framework, and/or combination thereof usable for providing and/or hosting a service (e.g., via the Internet). As used herein, the phrase "online service" may refer to any of a variety of services and/or Internet sites. Examples of online services may include social networking services, online shopping services (e.g., EBAY), online gaming services, etc. As used herein, the phrase "social networking service" may refer to any service and/or Internet site that manages social connections and/or shares, compiles, formats, and/or broadcasts information based on social connections. Examples of social networking platforms may include FACEBOOK, TWITTER, GOOGLE+, LINKEDIN, and FLICKR. In some examples, the online service may host data and/or process the data via cloud-based applications (e.g., web-based email clients, online calendar applications, online picture albums, etc.) for personal and/or private use.

As used herein, the phrase "third-party application" may refer to any application that may be integrated with but which is separable from the online service. For example, the phrase "third-party application" may refer to an application that provides access to an additional service via the online service. Additionally or alternatively, the phrase "third-party application" may refer to an application that customizes an interaction with the online service. In some examples, the phrase "third-party application" may refer to an application that a user may enable and/or disable within the online service. Additionally or alternatively, the phrase "third-party application" may refer to an application developed independently from the online service (e.g., by a separate vendor instead of the vendor of the online service). In at least one example, the phrase "third-party application" may refer to an add-on application available for the online service. In some examples, the phrase "third-party application" may refer to an application specifically designed for and/or only operable via the online service. One example of a third-party application may include a flight booking application allowing a user to book a flight via a social networking service (e.g., by drawing on data previously provided by the user via the social networking service). Another example of a third-party application may include a design application allowing a user to customize a seller page presented via an e-commerce service.

Identification module 104 may identify the online platform in any suitable manner. For example, identification module 104 may identify the online platform by identifying a network address of the online platform. Additionally or alternatively, identification module 104 may identify the online platform by identifying a name and/or unique identifier of the online platform. In some examples, identification module 104 may identify the online platform by identifying the online service and/or one or more third-party applications configured to operate on the online platform.

Returning to FIG. 3, at step 304 one or more of the systems described herein may identify at least one third-party application that is integrated with the online service and configured to operate on the online platform. For example, at step 304 application module 106 may, as part of computing device 202 in FIG. 2, identify at least one third-party application (e.g., application 212) that is integrated with service 210 and configured to operate on platform 206.

Application module 106 may identify the third-party application in any of a variety of ways. For example, application module 106 may identify user-generated content within the online service that references the third-party application. As used herein, the phrase "user-generated content" may refer to any post, comment, and/or submission to and/or within the online service. For example, the user-generated content may include a post that names the third-party application, that links to the third-party application, and/or that responds to a post that names and/or links to the third-party application. As another example, application module 106 may identify the third-party application by identifying content generated by the third-party application within the online service. For example, application module 106 may identify a post, comment, and/or message generated by the third-party application (e.g., a post to a feed corresponding to a user account established for gathering information for the systems and methods described herein). Application module 106 may identify content generated by the third-party application with user prompting (e.g., a message transmitted by the third-party application with user input), content generated by the third-party application in response to user interaction (e.g., a post created in response to an event generated by the user interacting with the third-party application), and/or content otherwise generated (e.g., according to a schedule, in response to an environmental factor within the online service, etc.) by the third-party application.

In some examples, application module 106 may identify the third-party application by retrieving, from the online service, a list of third-party applications available on the online platform. For example, application module 106 may retrieve a list of third-party applications available on the online platform via an application programming interface of the online service. Additionally or alternatively, application module 106 may retrieve a list of third-party applications available on the online platform via an application of the online service (e.g., an application catalog application and/or an application store application of the online service). In an additional example, application module 106 may identify the third-party application by identifying an email flagged by a spam filter that references the third-party application. For example, a spam filtering system may be configured to report spam contents to a security vendor. In this example, application module 106 and/or a separate application identification system may parse the spam to identify a reference to the third-party application. Application module 106 may then identify the reference to the third-party application. As another example, application module 106 may scan the online service (and/or one or more additional online services) for references to the application. For example, application module 106 may scan a wall and/or feed of one or more profiles within the online service for a reference to the third-party application, and/or scan messages sent within the online service for a reference to the third-party application.

Application module 106 may also crawl and/or scan the Internet to identify third-party applications for the online service. For example, application module 106 may scan Internet posts, Internet advertisements, and/or perform searches via search engines (e.g., searches that specify the online service by name and "application," "game," "add-on," and/or other terms as appropriate).

Returning to FIG. 3, at step 306 one or more of the systems described herein may identify metadata describing at least one characteristic of the third-party application. For example, at step 306 metadata module 108 may, as part of computing device 202 in FIG. 2, identify metadata 220 describing characteristic 222 of application 212.

Metadata module 108 may identify the metadata in any of a variety of ways. For example, metadata module 108 may identify the metadata by retrieving the metadata from an application programming interface of the online service (e.g., the FACEBOOK GRAPH API). Additionally or alternatively, metadata module 108 may identify the metadata by interacting with the third-party application during an active session with the online service. For example, metadata module 108 may access a user account with the online service usable for retrieving information about third-party applications with the online service. In this example, metadata module 108 may interact with, access, and/or execute the third-party application and monitor the user account, the online service, and/or the local client system for the behavior of the online service.

In some examples, metadata module 108 may identify the metadata by parsing a canvas page representing at least a portion of the third-party application to identify textual content within the canvas page, links within the canvas page, a structure of the canvas page, and/or one or more elements within the canvas page. As used herein, the phrase "canvas page" may refer to any Internet document relayed by the online service to portray, interface with, execute, and/or facilitate the third-party application. Accordingly, metadata module 108 may identify the textual content within the canvas page to identify one or more topics and/or key words within the textual content that may characterize the third-party application. Likewise, metadata module 108 may identify one or more links within the canvas page to identify one or more additional Internet resources (e.g., and, in turn, identify a classification of the additional Internet resources and impute the classification of the additional Internet resources to the third-party application). The structure of the canvas page may include any information about types of content within the canvas page, the layout of the content within the canvas page, and/or the predominance of one or more content types and/or elements within the canvas page. For example, metadata module 108 may identify a predominant interactive multimedia element within the canvas page (e.g., potentially indicative of a gaming application).

Metadata module 108 may identify any of a variety of types of metadata relating to the third-party application. For example, metadata module 108 may identify one or more permissions used by the third-party application within the online platform. As used herein, the term "permission" may refer to any permission, privilege, designated access right, and/or authentication for accessing, using, manipulating, and/or viewing data within the online service and/or using a capability of the online service. In some examples, the permission may be granted by a user at the time of enabling the third-party application for a user account. For example, the online service may be configured to display one or more permissions required and/or used by the third-party application and to receive verification that the user will grant the permissions to the third-party application before activating the third-party application. In some examples, the online service may divide a set of capabilities of the online platform into a set of permissions to access the capabilities, and grant a subset of permissions to each activated third-party application. Examples of permissions may include a permission to access user-submitted profile data, user activity data, and/or user social networking connections; permission to create posts and/or send messages to a user and/or the social networking connections of a user; and/or permissions to share designated data with other users of the online service, other third-party applications within the online service, and/or external services.

In some examples, metadata module 108 may identify the metadata by identifying a profile space for the third-party application within the online service and then identifying at least one user-submitted comment to the commenting feed on the profile space. As used herein, the phrase "profile space" may refer to any Internet resource and/or node provided by the online service to describe and/or aggregate information about an entity (e.g., a third-party application). As used herein, the phrase "commenting feed" may refer to any wall and/or aggregation of comments relating to a subject (e.g., a third-party application).

Figure 4:
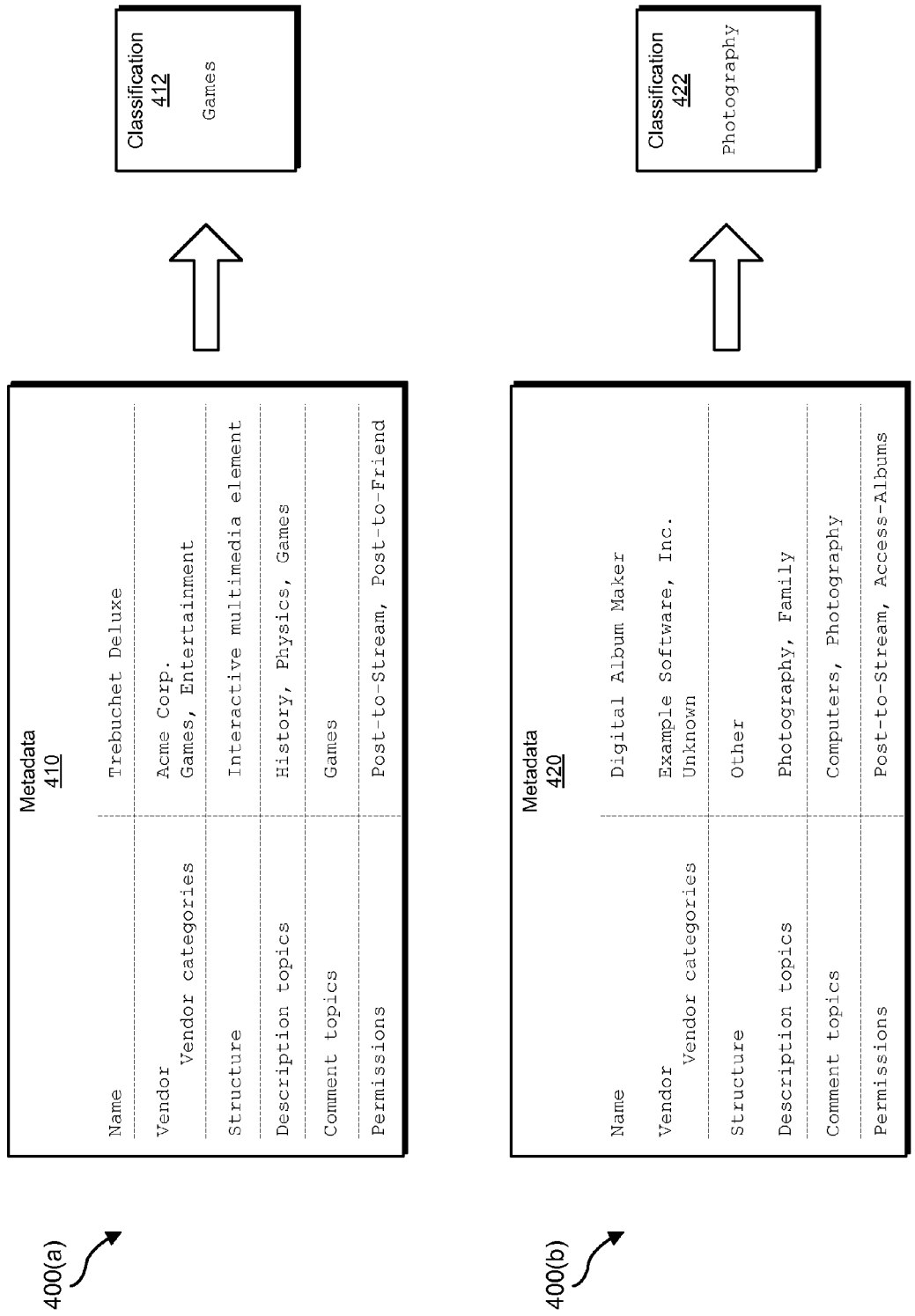
FIG. 4 is a diagram of exemplary classifications of applications configured for cloud-based platforms.

FIG. 4 illustrates exemplary classifications 400(a) and 400(b). As shown in FIG. 4, classification 400(a) may involve metadata 410 and classification 400(b) may involve metadata 420. Metadata 410 may include a variety of metadata collected about a third-party application for an online service (i.e., "Trebuchet Deluxe"), including the name of the vendor, categories of applications developed by the vendor, the structure of a canvas page for the third-party application, topics identified in a description of the third-party application (e.g., extracted from the description using a topic model such as latent Dirichlet allocation), topics identified in comments referencing the third-party application, and/or permissions requested by, granted to, and/or used by the third-party application (e.g., a permission to post to a user's content stream and to content streams of the user's friends on the online service). Metadata 420 may similarly include metadata collected about an additional third-party application for the online service (i.e., "Digital Album Maker"). Using FIG. 4 as an example, at step 306 metadata module 108 may identify metadata 410 for "Trebuchet Deluxe" (e.g., gathered from one or many sources) and/or metadata 420 for "Digital Album Maker."

Returning to FIG. 3, at step 308 one or more of the systems described herein may generate a classification of the third-party application based at least in part on the characteristic. For example, at step 308 classification module 110 may, as part of computing device 202 in FIG. 2, generate a classification of application 212 based at least in part on characteristic 222.

Classification module 110 may generate the classification in any of a variety of ways. For example, classification module 110 may determine, based on the metadata, that a vendor of the third-party application is also the vendor of an additional third-party application. As used herein, the term "vendor" may refer to any distinct entity designated as a creator, publisher, and/or distributor of an application. In some examples, the vendor of a third-party application may neither own nor control nor be owned or controlled by an entity that owns and/or controls the online service. Upon determining that the vendor of the third-party application is also the vendor of an additional third-party application, classification module 110 may identify an attribute of the additional third-party application (e.g., a classification and/or category of the additional third-party application) and generate the classification at least in part based on the attribute of the additional third-party application. For example, classification module 110 may impute a classification and/or category of the additional third-party application to the third-party application based on the shared vendor. In some examples, classification module 110 may determine that the vendor of the third-party application is also the vendor of an application for a different platform (e.g., not the online platform). In these examples, classification module 110 may similarly impute an attribute, classification, and/or category of the application for the different platform to the third-party application.

As mentioned earlier, in some examples one or more of the systems described herein may identify one or more permissions used by the third-party application within the online platform. In these examples, classification module 110 may generate the classification by identifying a classification of applications with a legitimate use for the permission. For example, classification module 110 may identify one or more classifications of applications that have been granted the permission. Additionally or alternatively, classification module 110 may identify a table linking permissions and/or groups of permissions to likely categories of applications. For example, classification module 110 may determine that a permission allowing the third-party application access to a user's relationship status may indicate that the third-party application is a dating application.

Classification module 110 may generate the classification in any of a variety of ways. For example, classification module 110 may identify multiple characteristics of the third-party application and identify a probable classification based on each characteristic. Classification module 110 may then identify a most frequent classification of the characteristics of the third-party application as the classification of the third-party application. As another example, classification module 110 may identify probabilities that the third-party application belongs to various classifications based on each characteristic of the third-party application. Classification module 110 may then aggregate the probabilities to determine the most probable classification (e.g., using a suitable statistical method of inference such as a Bayesian inference).

Using FIG. 4 as an example, classification module 110 may determine, based on metadata 410, that since the vendor of the third-party application "Trebuchet Deluxe" is classified as creating games, an extracted topic of a description of the third-party application is "Games," an extracted topic of comments about the third-party application is "Games," and the structure of a canvas page of the third-party application is a predominant interactive multimedia element (e.g., ADOBE FLASH), that the third-party application is most likely a game. Accordingly, generation module 110 may generate a classification 412 of "Trebuchet Deluxe" as "Games." Likewise, classification module 110 may determine, based on metadata 420, that based on the "Photography" topics found in the description and comments of the third-party application "Digital Album Maker," and due to a permission used by the third-party application to access a user's photo albums, that the third-party application is most likely a photography application. Accordingly generation module 110 may generate a classification 422 of "Digital Album Maker" as "Photography."

In some examples, classification module 110 may further provide the classification for use by one or more additional systems. For example, classification module 110 may provide the classification to a security system for evaluating third-party applications integrated with the online service. In this example, the security system may use the classification to determine whether the behavior of a third-party application within the online service is consistent with the expected behavior of a third-party application with the classification. As another example, classification module 110 may provide the classification to a content control system for third-party applications integrated with the online service. As used herein, the phrase "content control system" may refer to any system to controlling access to, filtering, and/or warning about content. For example, the content control system may include a parental control system. Accordingly, the content control system may use the classification to determine whether a third-party application is appropriate for a child user, whether a child user has spent too much time using a third-party application, etc. Additionally or alternatively, the content control system may determine whether the third-party application deals with illicit subjects, violates the terms of service of the online service and/or an Internet service provider, etc. In additional examples, classification module 110 may provide the classification to a search index for the online service (e.g., to facilitate a user in finding applications of certain categories) and/or to a user of the online service (e.g., to give a user more information about the use and/or purpose of the third-party application).

As explained above, by identifying the applications (e.g., as separate from the cloud-based platforms which host them) and identifying metadata (e.g., by requesting, extracting, crawling for, and/or mining for the metadata) useful for classifying the applications, the systems and methods described herein may facilitate and/or enable the limiting of access to illegitimate, malicious, and/or undesired third-party applications within otherwise trusted cloud-based platforms. For example, the classifications generated by these systems and methods may facilitate security analyses of third-party applications, content-control filtering of third-party applications, and/or organization of third-party applications.

Figure 5:
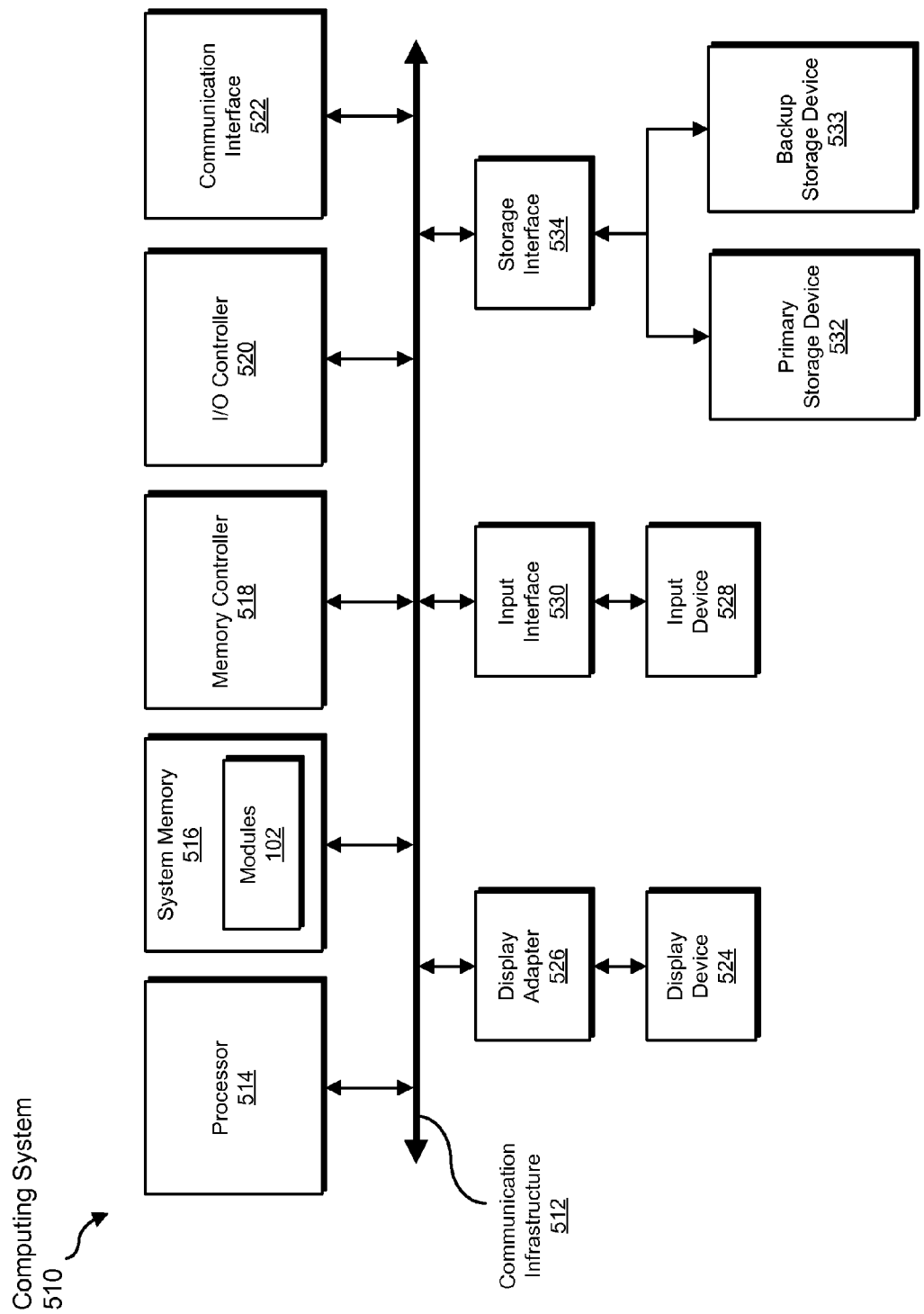
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, retrieving, interacting, parsing, determining, generating, and providing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
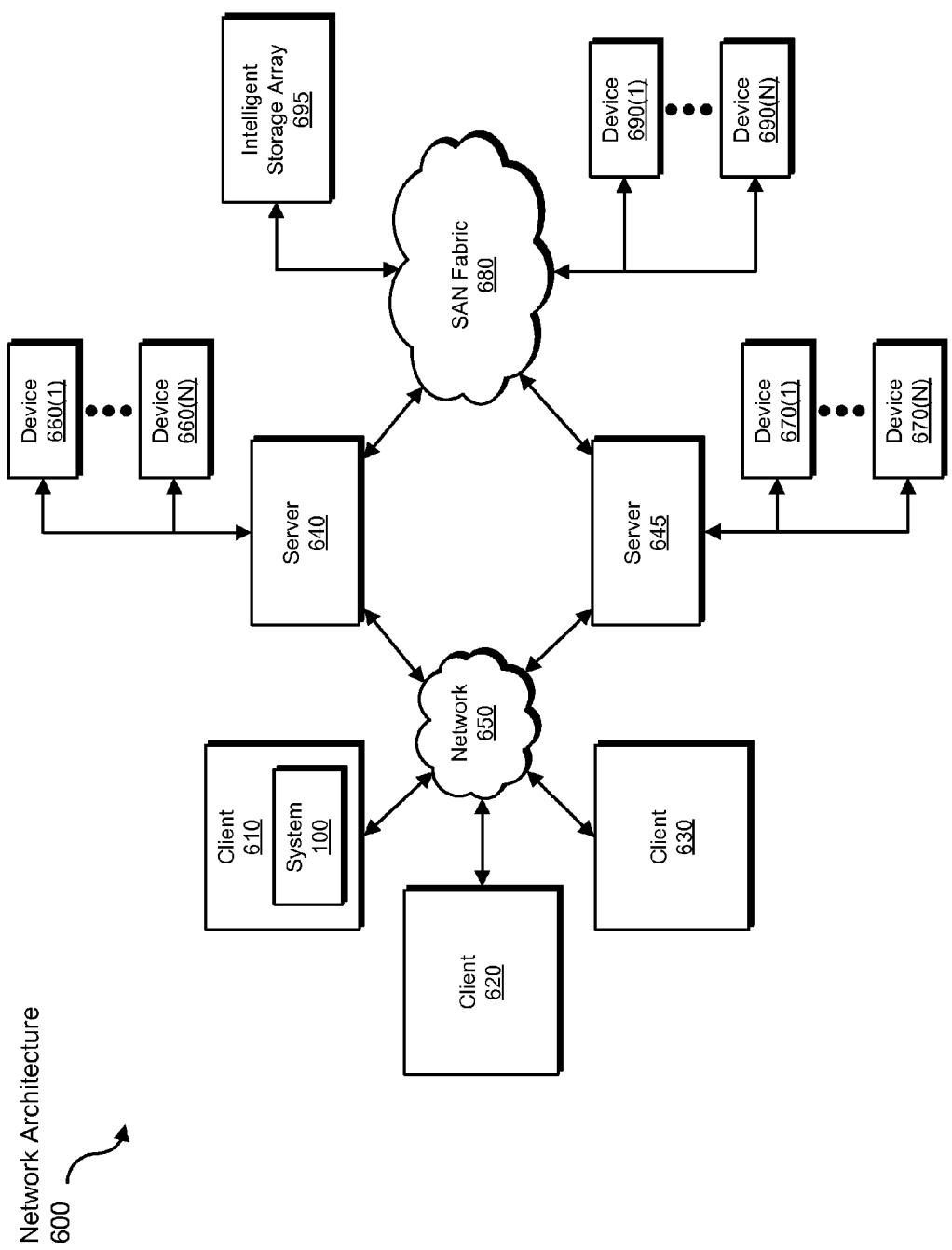
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, retrieving, interacting, parsing, determining, generating, and providing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for classifying applications configured for cloud-based platforms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for classifying third-party applications configured for cloud-based platforms.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for classifying applications configured for cloud-based platforms, at least a portion of the method being performed by a computing device comprising at least one processor, the method comprising:

identifying an online platform that hosts an online service via the Internet and that is capable of hosting a plurality of third-party applications integrated with the online service and configured to operate on the online platform, wherein the online service hosts and/or processes data via one or more cloud-based applications;

identifying at least one third-party application as being separate from and configured to operate on the online platform, the third-party application being integrated with the online service and provided by a separate vendor than a vendor of the online service, wherein the online platform is trusted and the third-party application is not yet classified;

identifying a combination of items of metadata, each item of metadata describing at least one characteristic of the third-party application, the combination of items of metadata including at least two of:

an identity of the vendor that provides the third-party application;

a canvas page representing at least a portion of the third-party application;

a topic extracted from text about the third-party application;

permissions used by the third-party application;

generating a most probable classification of the third-party application based on an analysis of the combination of items of metadata.

2. The computer-implemented method of claim 1, wherein identifying the combination of items of metadata comprises retrieving an item of metadata from an application programming interface of the online service.

3. The computer-implemented method of claim 1, wherein identifying the combination of items of metadata comprises interacting with the third-party application during an active session with the online service.

4. The computer-implemented method of claim 1, wherein identifying the combination of items of metadata comprises parsing the canvas page representing at least a portion of the third-party application to identify at least one of:

textual content within the canvas page;

links within the canvas page;

a structure of the canvas page;
at least one element within the canvas page.

5. The computer-implemented method of claim 1, wherein generating the classification of the third-party application comprises:
   determining, based on the combination of items of metadata, that the vendor that provides the third-party application is also the vendor of an additional third-party application;
   identifying an attribute of the additional third-party application;
   generating the classification based at least in part on the attribute of the additional third-party application.

6. The computer-implemented method of claim 1, wherein:
   identifying the combination of items of metadata comprises identifying at least one permission used by the third-party application within the online platform;
   generating the classification comprises identifying a classification of applications with a legitimate use for the permission.

7. The computer-implemented method of claim 1, wherein identifying the combination of items of metadata comprises:
   identifying a profile space for the third-party application within the online service;
   identifying at least one user-submitted comment to a commenting feed on the profile space.

8. The computer-implemented method of claim 1, wherein identifying the third-party application comprises:
   retrieving, from the online service, a list of third-party applications available on the online platform.

9. The computer-implemented method of claim 1, wherein the one or more cloud-based applications comprises at least one of:
   a web-based email client;
   an online calendar application;
   an online picture album;
   an online office suite application.

10. The computer-implemented method of claim 1, further comprising providing the classification to at least one of:
    a security system for evaluating third-party applications integrated with the online service;
    a content control system for third-party applications integrated with the online service;
    a search index for the online service;
    a user of the online service.

11. A system for classifying applications configured for cloud-based platforms, the system comprising:
    an identification module programmed to identify an online platform that hosts an online service via the Internet and that is capable of hosting a plurality of third-party applications integrated with the online service and configured to operate on the online platform, wherein the online service hosts and/or processes data via one or more cloud-based applications;
    an application module programmed to identify at least one third-party application as being separate from and configured to operate on the online platform, the third-party application being integrated with the online service and provided by a separate vendor than a vendor of the online service, wherein the online platform is trusted and the third-party application is not yet classified;
    a metadata module programmed to identify a combination of items of metadata, each item of metadata describing at least one characteristic of the third-party application, the combination of items of metadata including at least two of:
        an identity of the vendor that provides the third-party application;
        a canvas page representing at least a portion of the third-party application;
        a topic extracted from text about the third-party application;
        permissions used by the third-party application;
    a classification module programmed to generate a most probable classification of the third-party application based on an analysis of the combination of items of metadata;
    at least one processor configured to execute the identification module, the application module, the metadata module, and the classification module.

12. The system of claim 11, wherein the metadata module is programmed to identify the combination of items of metadata by retrieving an item of metadata from an application programming interface of the online service.

13. The system of claim 11, wherein the metadata module is programmed to identify the combination of items of metadata by interacting with the third-party application during an active session with the online service.

14. The system of claim 11, wherein the metadata module is programmed to identify the combination of items of metadata by parsing the canvas page representing at least a portion of the third-party application to identify at least one of:
    textual content within the canvas page;
    links within the canvas page;
    a structure of the canvas page;
    at least one element within the canvas page.

15. The system of claim 11, wherein the classification module is programmed to generate the classification of the third-party application by:
    determining, based on the combination of items of metadata, that the vendor that provides the third-party application is also the vendor of an additional third-party application;
    identifying an attribute of the additional third-party application;
    generating the classification based at least in part on the attribute of the additional third-party application.

16. The system of claim 11, wherein:
    the metadata module is programmed to identify the combination of items of metadata by identifying at least one permission used by the third-party application within the online platform;
    the classification module is programmed to generate the classification by identifying a classification of applications with a legitimate use for the permission.

17. The system of claim 11, wherein the metadata module is programmed to identify the combination of items of metadata at least in part by:
    identifying a profile space for the third-party application within the online service;
    identifying at least one user-submitted comment to a commenting feed on the profile space.

18. The system of claim 11, wherein the metadata module is programmed to identify the third-party application at least in part by retrieving, from the online service, a list of third-party applications available on the online platform.

19. The system of claim 11, wherein the one or more cloud-based applications comprises a web-based email client.

20. A non-transitory computer-readable-storage medium comprising one or more computer-executable instructions that, when executed by at least one processor of a computing device, cause the computing device to:

identify an online platform that hosts an online service via the Internet and that is capable of hosting a plurality of third-party applications integrated with the online service and configured to operate on the online platform, wherein the online service hosts and/or processes data via one or more cloud-based applications;

identify at least one third-party application as being separate from and configured to operate on the online platform, the third-party application being integrated with the online service and provided by a separate vendor than a vendor of the online service, wherein the online platform is trusted and the third-party application is not yet classified;

identify a combination of items of metadata, each item of metadata describing at least one characteristic of the third-party application, the combination of items of metadata including at least two of:

a canvas page representing at least a portion of the third-party application;

a topic extracted from text about the third-party application;

permissions used by the third-party application;

generate a most probable classification of the third-party application based on an analysis of the combination of items of metadata.

\* \* \* \* \*